US012000973B2

(12) United States Patent
Bose et al.

(10) Patent No.: US 12,000,973 B2
(45) Date of Patent: Jun. 4, 2024

(54) THROUGH TUBING NEAR-FIELD SONIC MEASUREMENTS TO MAP OUTER CASING ANNULAR CONTENT HETEROGENEITIES

(71) Applicant: Schlumberger Technology Corporation, Sugar Land, TX (US)

(72) Inventors: Sandip Bose, Brookline, MA (US); Ralph D'Angelo, North Weymouth, MA (US); Smaine Zeroug, Lexington, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 17/659,913

(22) Filed: Apr. 20, 2022

(65) Prior Publication Data
US 2022/0334284 A1 Oct. 20, 2022

Related U.S. Application Data

(60) Provisional application No. 63/176,947, filed on Apr. 20, 2021.

(51) Int. Cl.
*G01V 1/50* (2006.01)
(52) U.S. Cl.
CPC ............ *G01V 1/50* (2013.01); *G01V 2210/74* (2013.01)
(58) Field of Classification Search
CPC .... G01V 1/50; G01V 2210/74; E21B 47/107; E21B 47/005
See application file for complete search history.

(56) References Cited

U.S. PATENT DOCUMENTS

2008/0027650 A1* 1/2008 Huang ................ G01V 1/48
702/11
2010/0223988 A1 9/2010 Crow et al.
(Continued)

FOREIGN PATENT DOCUMENTS

| WO | 2019084219 A1 | 5/2019 | |
| WO | 2019236832 A1 | 12/2019 | |
| WO | WO-2019236832 A1 * | 12/2019 | ......... E21B 47/0025 |

OTHER PUBLICATIONS

B. Fan, "Exploiting Correlation Structures for Geoscience", Tufts University ProQuest Dissertations Publishing, 2018. 10791613 (Year: 2018).*

(Continued)

*Primary Examiner* — Douglas Kay
(74) *Attorney, Agent, or Firm* — Ashley E. Brown

(57) ABSTRACT

Aspects described herein provide for methods and apparatus for characterizing azimuthal heterogeneities in a barrier installed outside an outer casing in a borehole traversing a formation in a cased hole configuration including an inner and outer casing. The approach is based on specific attributes in sonic signals acquired with an azimuthal and axial array receiver system located inside the inner casing. The methods include slowness-time-coherence (STC) processing based on specific arrivals identified in data acquired by axial arrays associated with multiple azimuthal sections of the receiver system. The specific arrivals contain STC signatures that can be examined in terms of coherence amplitude and localization within STC maps. Based on specific attributes in the sonic signals, an azimuthal coverage of the outer casing annular contents can be created.

17 Claims, 9 Drawing Sheets

(56) References Cited

U.S. PATENT DOCUMENTS

| | | | |
|---|---|---|---|
| 2014/0365133 A1* | 12/2014 | Elkington | G01V 1/50 |
| | | | 702/14 |
| 2015/0198032 A1 | 7/2015 | Sinha et al. | |
| 2019/0113639 A1* | 4/2019 | Khadhraoui | G01V 1/282 |
| 2020/0341163 A1 | 10/2020 | Wang et al. | |
| 2021/0247537 A1 | 8/2021 | Zhu et al. | |
| 2021/0270127 A1* | 9/2021 | Zhu | G06N 3/047 |

OTHER PUBLICATIONS

Pistre, V., et al., Jun. 2005. "A modular wireline sonic tool for measurements of 3D formation acoustic properties." 46th Annual Symposium of the Society of Petroleum Well Log Analysts. New Orleans. (13 pages).

Kimball, C.V. et al., 1984. "Semblance processing of borehole acoustic array data." Geophysics 264-281.

Search Report and Written Opinion of International Patent Application No. PCT/US2022/025566 dated Aug. 5, 2022, 11 pages.

International Preliminary Report on Patentability of International Patent Application No. PCT/US2022/025566 dated Nov. 2, 2023, 7 pages.

* cited by examiner

158 ⟶

160 — Exciting a cased hole configured with double casing with at least one sonic source

162 — Acquiring signals with a plurality of receiving element arrays situated at a plurality of azimuthal sectors in a vicinity of the at least one sonic source

164 — Processing the acquired signals with the plurality of receiving element arrays

166 — Examining the processed signals for arrivals and determining whether the arrivals exhibit uniform or non-uniform signatures across all azimuths

168 — Deriving a map based on the signatures reflecting azimuthal coverage of contents of an annular space outside of the outer casing

FIG. 9

THROUGH TUBING NEAR-FIELD SONIC MEASUREMENTS TO MAP OUTER CASING ANNULAR CONTENT HETEROGENEITIES

CROSS-REFERENCE TO RELATED APPLICATION

This application claims priority to and the benefit of U.S. Provisional Patent Application Ser. No. 63/176,947, entitled "Through Tubing Near-Field Sonic Measurements to Map Outer Casing Annular Content Heterogeneities," filed Apr. 20, 2021, which is hereby incorporated by reference in its entirety for all purposes.

FIELD OF THE INVENTION

Aspects of the disclosure relate to sonic and ultrasonic wellbore measurements. More specifically, aspects of the disclosure provide for mapping annular content heterogeneities in proximity to well casings using through tubing sonic/ultrasonic measurements.

BACKGROUND INFORMATION

Sonic and ultrasonic wellbore measurements can be used for well integrity evaluations for plug and abandonments, cement evaluation through well tubing, and acoustic annulus evaluation through well casing strings. Well integrity may be considered maintaining full control of fluids within a well at all times, in order to prevent unintended fluid movement or loss of containment to the environment. Well integrity evaluations provide vital information for natural resources (e.g., oil, gas, or water) production and various aspects (e.g., safety, environment, or cost) related to the production. However, completion hardware and complexities surrounding wells in different geological locations may create challenges for accurately mapping contents outside of the first completion casing. For instance, annular contents close to well casings of a well may vary with respect to an azimuth axis in a plane that is perpendicular to the well. Such azimuthal heterogeneities may be difficult to map in well integrity evaluations.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one non-limiting embodiment, a method of determining well integrity may include exciting a cased hole configured with double casing with at least one sonic source. The double casing includes an inner casing and an outer casing. The method may also include acquiring signals with a plurality of receiving element arrays situated at a plurality of azimuthal sectors in a vicinity of the at least one sonic source. The method may further include processing the acquired signals with the plurality of receiving element arrays. In addition, the method may include examining the processed signals for arrivals and determining whether the arrivals exhibit uniform or non-uniform signatures across all azimuths. The method may also include deriving a map based on the signatures reflecting azimuthal coverage of contents of an annular space outside of the outer casing.

In another example embodiment, a method of determining well integrity may include exciting a cased hole configured with double casing with at least one sonic source. The double casing includes an inner casing and an outer casing. The method may also include acquiring signals with a plurality of receiving element arrays situated at a plurality of azimuthal sectors in a vicinity of the at least one sonic source. The method may further include processing the acquired signals with the plurality of receiving element arrays using slowness-time-coherence (STC) techniques or bandpass frequency filtering to obtain STC signatures for specific arrivals. In addition, the method may include examining the STC signatures for the specific arrivals and determining whether the specific arrivals exhibit uniform or non-uniform signatures across all azimuths. The method may also include deriving a map based on the signatures reflecting azimuthal coverage of contents of an annular space outside of the outer casing.

In another example embodiment, a method of determining well integrity may include exciting a cased hole configured with double casing with at least one sonic source. The double casing includes an inner casing and an outer casing. The method may also include acquiring signals with a plurality of receiving element arrays situated at a plurality of azimuthal sectors in a vicinity of the at least one sonic source. The method may further include processing the acquired signals with the plurality of receiving element arrays using slowness-time-coherence (STC) techniques or bandpass frequency filtering to obtain STC signatures for specific arrivals. In addition, the method may include examining the STC signatures for the specific arrivals and determining whether the specific arrivals exhibit uniform or non-uniform signatures across all azimuths. The examination of the STC signatures includes examining multiplicity of an STC signature of a specific arrival along a slowness range of interest, determining that an annular space outside of the outer casing is uniformly covered with the same contents when the STC signature is single across all azimuths, and inferring an existence of azimuthally localized heterogeneities in the outer casing when the STC signature is multiple across multiple azimuths. The method may also include deriving a map based on the signatures reflecting azimuthal coverage of contents of the annular space.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted, however, that the appended drawings illustrate only typical embodiments of this disclosure and are therefore not to be considered limiting of its scope, for the disclosure may admit to other equally effective embodiments.

FIG. 9 is a flow diagram of a method of determining well integrity, in accordance with embodiments of the present disclosure.

DETAILED DESCRIPTION

Figure 1:
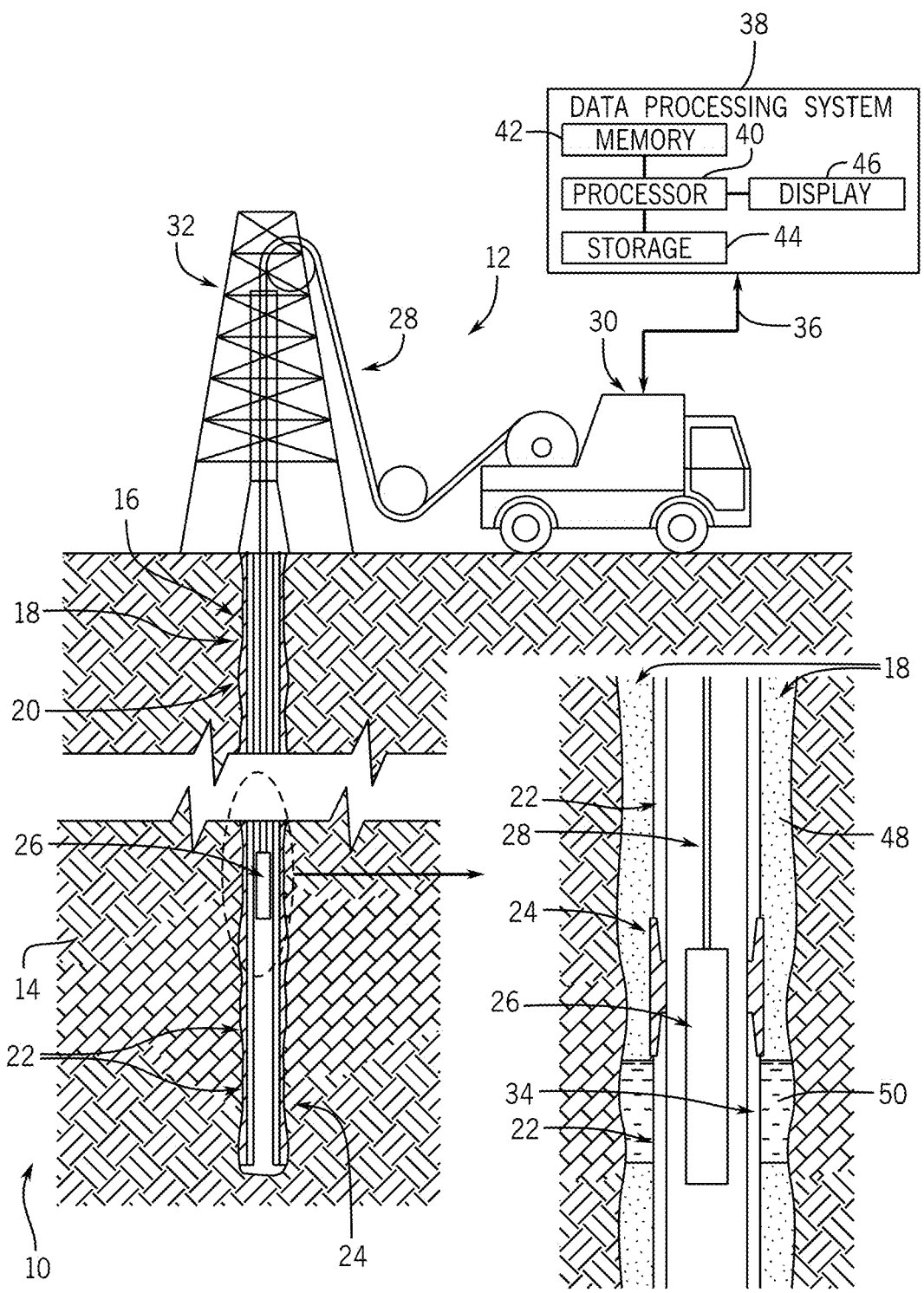
FIG. 1 depicts a schematic diagram of a system for verifying well integrity based on sonic and ultrasonic wellbore measurements, in accordance with embodiments of the present disclosure.

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

In addition, as used herein, the terms "real time", "real-time", or "substantially real time" may be used interchangeably and are intended to describe operations (e.g., computing operations) that are performed without any human-perceivable interruption between operations. For example, as used herein, data relating to the systems described herein may be collected, transmitted, and/or used in control computations in "substantially real time" such that data readings, data transfers, and/or data processing steps occur once every second, once every 0.1 second, once every 0.01 second, or even more frequent, during operations of the systems (e.g., while the systems are operating). In addition, as used herein, the terms "continuous", "continuously", or "continually" are intended to describe operations that are performed without any significant interruption. For example, as used herein, control commands may be transmitted to certain equipment every five minutes, every minute, every 30 seconds, every 15 seconds, every 10 seconds, every 5 seconds, or even more often, such that operating parameters of the equipment may be adjusted without any significant interruption to the closed-loop control of the equipment. In addition, as used herein, the terms "automatic", "automated", "autonomous", and so forth, are intended to describe operations that are performed are caused to be performed, for example, by a computing system (i.e., solely by the computing system, without human intervention). Indeed, it will be appreciated that the data processing system described herein may be configured to perform any and all of the data processing functions described herein automatically.

In addition, as used herein, the term "substantially similar" may be used to describe values that are different by only a relatively small degree relative to each other. For example, two values that are substantially similar may be values that are within 10% of each other, within 5% of each other, within 3% of each other, within 2% of each other, within 1% of each other, or even within a smaller threshold range, such as within 0.5% of each other or within 0.1% of each other.

Similarly, as used herein, the term "substantially parallel" may be used to define downhole tools, formation layers, and so forth, that have longitudinal axes that are parallel with each other, only deviating from true parallel by a few degrees of each other. For example, a downhole tool that is substantially parallel with a formation layer may be a downhole tool that traverses the formation layer parallel to a boundary of the formation layer, only deviating from true parallel relative to the boundary of the formation layer by less than 5 degrees, less than 3 degrees, less than 2 degrees, less than 1 degree, or even less.

In oil and gas production, well integrity evaluations provide important information for maintaining full control of fluids within a well at any time to prevent unintended fluid movement or loss of containment to the environment. Based on the well integrity evaluations, various applications of technical, operational, and organizational solutions may be implemented to reduce potential risks of uncontrolled release of formation fluids throughout a life cycle of the well. However, subsurface complexities (e.g., rock formations, muds, mixture of water and cement) surrounding the well and structure complexities (e.g., double casing) of the well may adversely affect accuracies of the well integrity evaluations. For example, in a double casing well, contents in an inner annulus (e.g., between an inner casing and an outer casing) may be different from contents in an outer annulus (e.g., outside the outer casing). Moreover, the contents in the outer annulus may vary for different azimuthal angles. Such complexities, including heterogeneities (e.g., axial and azimuthal heterogeneities), may be challenging for mapping the annular contents in a near-field through the double casing.

The present disclosure relates to the use of specific attributes in the sonic signals acquired with an azimuthal and axial array receiver system through a tubing or a casing as a basis for an evaluation of the azimuthal coverage of solids in an annular space outside an outer casing (referred to as annulus B, with respect to annulus A referred to as another annular space between an inner casing and the outer casing). Slowness-time-coherence (STC) processing based on data acquired by axial arrays associated with multiple azimuthal sections of the receiver system may yield specific arrivals. Such specific arrivals may contain STC signatures that may be examined in terms of coherence amplitude and localization within STC maps. Based on the specific attributes (e.g., STC attributes) in the sonic signals, an azimuthal coverage of the contents within the annulus B may be created. For instance, the azimuthal coverage may include a presence of a liquid-filled channel in an otherwise cemented annulus B or that of an azimuthally-localized heterogeneity of significant or mild acoustic contrast to the rest of the annulus B. Through additional processing, the azimuthal coverage may be presented in terms of azimuthal coverage maps of the annulus B that may be used as the basis for an interpretation regarding whether a depth interval of a well examined provides a seal or not from undesirable fluid flow in annulus B. Such information may be important to plan and execute a cost-efficient intervention for plugging and abandoning a lower interval of the well. Additional details related to mapping annular content heterogeneities in proximity to well casings using through tubing sonic/ultrasonic measurements will be described below.

By way of introduction, FIG. 1 depicts a schematic diagram of a system 10 for verifying well integrity based on sonic and ultrasonic wellbore measurements. In particular, FIG. 1 illustrates surface equipment 12 above a geological formation 14. In the example of FIG. 1, a drilling operation has previously been carried out to drill a wellbore 16. In the illustrated embodiment, cement 18 has been used to seal an annulus 20 (i.e., the space between the wellbore 16 and casing joints 22 and collars 24) with cementing operations.

As seen in FIG. 1, several casing joints 22 (also referred to below as casing 22) are coupled together by the casing collars 24 to stabilize the wellbore 16. The casing joints 22 represent lengths of conductive pipe, which may be formed from steel or similar materials. In certain embodiments, the casing joints 22 each may include an externally threaded (male thread form) connection at each end. A corresponding internally threaded (female thread form) connection in the casing collars 24 may connect two nearby casing joints 22. Coupled in this way, the casing joints 22 may be assembled to form a casing string 34 to a suitable length and specification for the wellbore 16. The casing joints 22 and/or collars 24 may be made of carbon steel, stainless steel, or other suitable materials to withstand a variety of forces, such as collapse, burst, and tensile failure, as well as chemically aggressive fluid.

The surface equipment 12 may carry out various well logging operations to detect conditions of the wellbore 16, as described in greater detail herein. The well logging operations may measure parameters of the geological formation 14 (e.g., resistivity or porosity) and/or the wellbore 16 (e.g., temperature, pressure, fluid type, or fluid flowrate). As will be discussed in greater detail below, some of these measurements may be obtained at various points in the design, drilling, and completion of the well, and may be used in an integrated cement evaluation. Other measurements may be obtained that are specifically used to determining well integrity, as described in greater detail herein. As also described in greater detail herein, an acoustic logging tool 26 may obtain at least some of these measurements.

The example of FIG. 1 shows the acoustic logging tool 26 being conveyed through the wellbore 16 by a cable 28. Such a cable 28 may be a mechanical cable, an electrical cable, or an electro-optical cable that includes a fiber line protected against the harsh environment of the wellbore 16. In other embodiments, however, the acoustic logging tool 26 may be conveyed using any other suitable conveyance, such as coiled tubing. The acoustic logging tool 26 may obtain measurements of amplitude and variable density from sonic acoustic waves, acoustic impedance from ultrasonic waves, and/or flexural attenuation and velocity from the third interface echo. The availability of these independent measurements may be used to increase accuracy and confidence in the well integrity evaluation and interpretation made possible by the acoustic logging tool 26.

The acoustic logging tool 26 may be deployed inside the wellbore 16 by the surface equipment 12, which may include a vehicle 30 and a deploying system such as a drilling rig 32. Data related to the geological formation 14 or the wellbore 16 gathered by the acoustic logging tool 26 may be transmitted to the surface, and/or stored in the acoustic logging tool 26 for later processing and analysis. In certain embodiments, the vehicle 30 may be fitted with or may communicate with a computer and software to perform data collection and analysis.

FIG. 1 also schematically illustrates a magnified view of a portion of the wellbore 16. As mentioned above, the acoustic logging tool 26 may obtain acoustic measurements relating to the presence of solids or liquids behind the casing 22. When the acoustic logging tool 26 provides such measurements to the surface equipment 12 (e.g., through the cable 28), the surface equipment 12 may pass the measurements as data 36 to a data processing system 38 that includes a processor 40, memory 42, storage 44, and/or a display 46. In other examples, the data 36 may be processed by a similar data processing system 38 at any other suitable location (e.g., remote data center). The data processing system 38 may collect the data 36 and determine one or more indices and indicators that, as described in greater detail herein, may objectively indicate the well integrity. Additionally or alternatively, the data processing system 38 may correlate a variety of data obtained throughout the creation of the well (e.g., design, drilling, logging, well completion, etc.) that may assist in the evaluation of the well integrity. Namely, the processor 40, using instructions stored in the memory 42 and/or storage 44, may calculate the indicators and/or indices and/or may collect and correlate the other data into the well integrity evaluation. As such, the memory 42 and/or the storage 44 of the data processing system 38 may be any suitable article of manufacture that can store the instructions. The memory 42 and/or the storage 44 may be ROM, random-access memory (RAM), flash memory, an optical storage medium, or a hard disk drive, to name a few examples. The display 46 may be any suitable electronic display that can display the logs, indices, and/or indicators relating to the well integrity.

Figure 2:
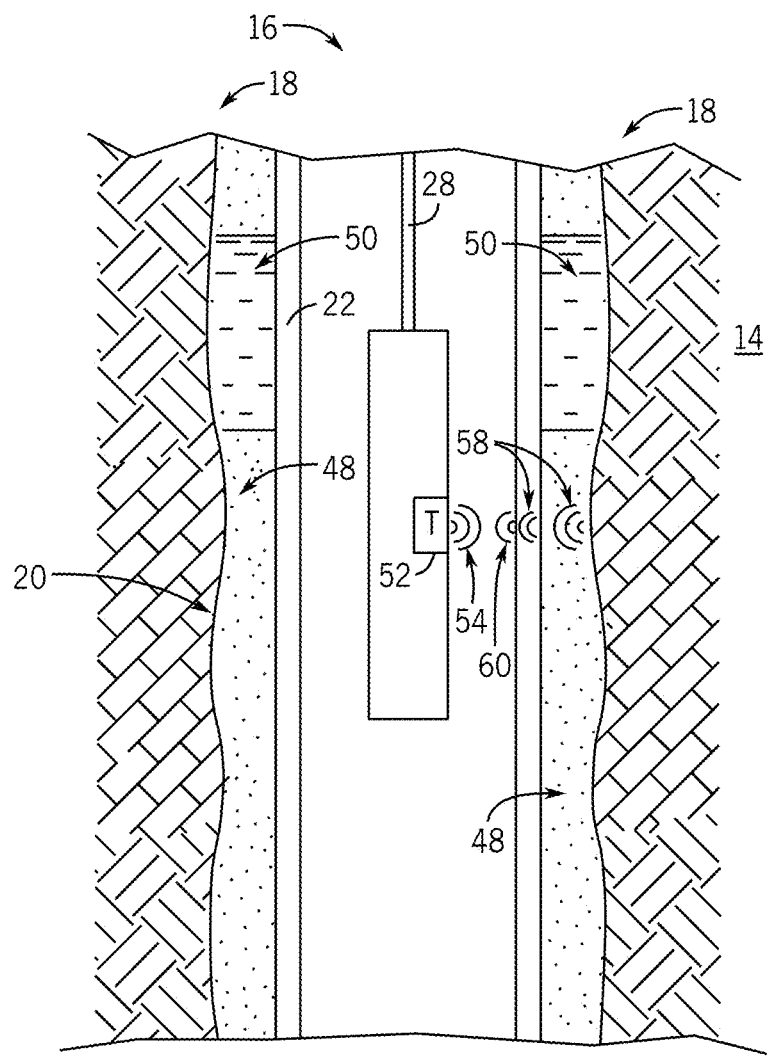
FIG. 2 depicts an example operation of an acoustic downhole tool, in accordance with embodiments of the present disclosure.

With this in mind, FIG. 2 depicts an example operation of the acoustic logging tool 26 in the wellbore 16. Specifically, in certain embodiments, a transducer 52 in the acoustic logging tool 26 may emit acoustic waves 54 out toward the casing 22. Reflected acoustic waves 58, 60 may correspond to interfaces at the casing 22, the cement 18, and the geological formation 14, respectively. The acoustic logging tool 26 may use any suitable number of different techniques, including measurements of amplitude and variable density from sonic acoustic waves, acoustic impedance from ultrasonic waves, and/or flexural attenuation and velocity from the third interface echo. There are mathematical models with each method that are used to calculate properties of the contents in the annulus 20. As mathematical models, many assumptions and simplifications of the real world may be employed. These may involve corrections and calibration or reference point checks.

One or more methods of using acoustic measurements for well integrity are disclosed. For example, the disclosed methods may be utilized in plug and abandonment applications to determine well integrity. In addition, one or more methods of using acoustic measurements may be with sonic logging measurements through a production tubing to evaluate the state of an annular space outside of a reservoir casing (e.g., annulus B), as such the measurements are conducted through two casing strings.

The acoustics measurement may be used to provide an assessment of the annular space with azimuthal resolution. For instance, when the annular space is cemented, the assessment aims to inspect non-invasively whether a cement coverage is azimuthally uniform to provide a seal against fluid upward annular flow. Azimuthal heterogeneities in a cement sheath may form initially during a cement placement process or during a lifetime of the well as it is produced over a large number of years. Such heterogeneities, if liquid filled or very compliant, may provide means for undesirable annular fluid flows.

The specific sonic modality employed here may rely on near-field effects whereby a cased-hole environment with double string is excited by a monopole, dipole, or quadrupole sonic source and detected with an array of sonic sensing elements placed further way from the sonic source. In the embodiment disclosed herein, a sonic tool used has sensors deployed across eight (8) azimuthal sectors with each sector equipped with a 13-sensing element array (e.g., SonicScanner™ offered by Schlumberger). Other now known and future known sonic tools may also be used. The sonic tool may allow a data processing system (e.g., the data processing system 38) to detect propagating waves and to characterize the detected propagating waves in terms of sonic attributes, such as Slowness-Time-Coherence (STC) signatures in a slowness-time domain, modal slowness dispersions in a slowness-frequency domain, and so on. Slowness is a quantity introduced in seismology, which is a reciprocal of velocity. These attributes may consequently provide means to diagnose a state of an annular space (e.g., annulus B) along with other elements of the cased-hole environment probed.

The methods disclosed herein focus on a subset of attributes to detect and size the annular heterogeneities that may be present in annulus B when a sonic logging is conducted through a production tubing. More specifically, the disclosed methods focus on the STC maps formed from detected signals arising from exciting the cased-hole environment with a monopole source in the sonic tool, such as SonicScanner™. The monopole source may be positioned adjacent to the array of sonic sensing elements. This monopole source may be referred to as the NEAR monopole transmitter. In one or more embodiments, the sonic tool may feature two NEAR monopole sources: one above, and one below, a tool receiver section, such as the configuration on the SonicScanner™. Either on its own, or both, are employed to generate the results described herein.

The annular space may be determined to be homogeneous and is either solid-filled or liquid-filled when the detected signals arising from exciting the cased-hole environment with one or more monopole sources are compact, as projected against a slowness axis, across all azimuthal sections. Such detected signals may yield STC signatures or footprints (e.g., STC arrivals at different times and having different slowness) in the slowness-time domain. However, when the detected signals arising from exciting the cased-hole environment with one or more monopole sources at no compact as they may degenerate into more than one distinct arrivals at specific azimuthal sections. That is, a degeneration or a significant disruption of the STC footprints may indicate the presence of azimuthally-localized heterogeneities such as the presence of a liquid channel in an otherwise cemented annulus or a cemented annulus with a strongly mud-contaminated part.

Further, when the STC footprints are compact, the data processing system may examine a level of coherence. If the level of coherence is not fully established, the data processing system may determine an incoherence of the STC footprints is due to a heterogeneity that is of limited extent either in acoustic contrast or in azimuthal spread. For instance, the incoherence of the STC footprints may be due to the presence of an azimuthally-narrow heterogeneity of significant acoustic contrast to the rest of the solids in the annular space. In certain embodiments, the incoherence of the STC footprints may be due to an azimuthal section filled with solids of lower acoustic contrast relatively to the solids filling the rest of the annulus.

Additional effects may actually perturb coherence amplitudes of a compact STC arrival in a double casing well including an inner casing and an outer casing. The first effect is the eccentricity of the inner casing with respect to the outer casing that may lead to an azimuthally-non-uniform channel in the annulus A (annular space between the two casings). This eccentricity may transfer acoustic energy from a source-excited monopole wavefield distribution to higher-order modes such as dipole or quadrupole, therefore reducing the portion of the acoustic energy that is transferred to the monopole mode propagating into the annulus B content to be probed. The second effect may arise from an azimuthally-non-uniform bond of the annulus B content to the outer casing on the one hand and to a formation (e.g., the geological formation 14) on the other hand. Such non-uniform azimuthal distribution of the bond may arise from the eccentricity of the outer casing with respect to the formation. These effects on the coherence level of the specific STC arrival may be taken into consideration when interpreting the STC arrivals in terms of the azimuthal coverage of the annulus B fill. The interpretation of the specific STC arrival as a diagnosis of the azimuthal heterogeneity may be based on data processing using deterministic physics as well as machine-learning techniques. The diagnosis may be presented (e.g., via the display 46) as an azimuthal coverage map of the annulus B to help in rapid interpretation and understanding of the state of the annulus B and may be used for decision-making with respect to potential well intervention.

Although the sonic source described in the above embodiments is of the monopole type, it should be noted that other types of sonic/ultrasonic sources, such as a dipole or quadrupole, may be used in other embodiments. In such embodiments, the wavefield radiated and propagated in the annulus B may have a different type and may exhibit STC arrivals at different slowness ranges. However, the disruption of the STC footprints due to the existence of azimuthal heterogeneities may also be present for the STC arrivals. In some embodiments, forward modeling and machine learning techniques may be employed to identify the type of the STC arrivals to monitor the STC signatures and degeneration/disruption of the STC footprints arising from an azimuthal heterogeneity, such as a liquid channel in an otherwise cemented annulus B. In certain embodiments that have an inner casing eccentricity, higher-order source modes (e.g., dipole or quadrupole modes) may transfer a portion of the acoustic energy to the monopole mode. The transferred energy may generate monopole wave propagation with a considerable signal-to-noise ratio (SNR) that may be detected by the array of sonic sensing elements. In such cases, the similar STC arrival as discussed above may be present and similar data processing may be used to process such monopole arrivals.

Figure 3:
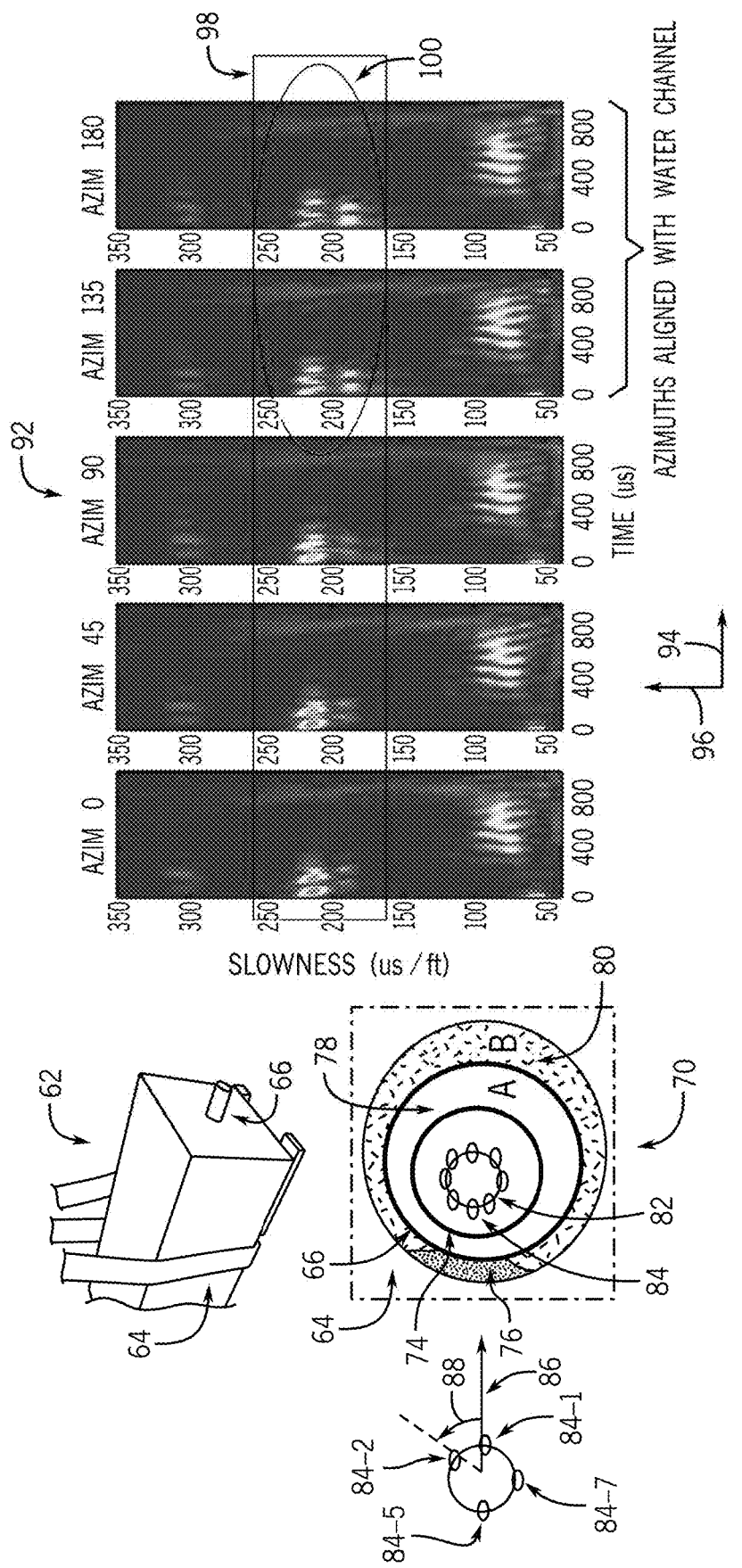
FIG. 3 depicts experimental results for a scaled through tubing sonic monopole acquisition, in accordance with embodiments of the present disclosure.

As mentioned above, a sonic source (e.g., a monopole sonic source) may be used to excite a cased-hole (e.g., double casing hole) environment and an array of sonic sensing elements may be used to detect reflected acoustic waves corresponding to various interfaces (e.g., interfaces at the casing 22, the cement 18, and the geological formation 14, respectively). With the preceding in mind, FIG. 3 depicts experimental results for a scaled through tubing sonic monopole acquisition. A sub-diagram 62 illustrates a 3-dimensional view of a sandstone formation 64 (e.g., a sandstone rock block) with an outer casing 66 protruding on one side of the rock block. Such experimental setup may be used to simulate a double casing well drilled into a geological formation, as described previously with reference to FIGS. 1 and 2.

A second sub-diagram 70 illustrates a cross-section view of the sandstone formation 64 with a double casing tubing. As illustrated, the double casing tubing includes the outer casing 66 and an inner casing 74. The outer casing 66 is cemented to the sandstone formation 64 across all azimuthal sections except for a water-filled section 76. Such water-filled section may include a water channel. As mentioned above, an annular space 78 between the outer casing 66 and the inner casing 74 may be referred to as annulus A, and an annular space 80 between the outer casing 66 and the sandstone formation 64 may be referred to as annulus B. In the illustrated embodiment, the annulus A is filled with water, the annulus B is partially cemented with the water-filled section 76. A space inside the inner casing 74 is also filled with water except for a section where a sensor holder 82 is positioned. Multiple sensors 84 (e.g., acoustic sensors) are employed on the sensor holder 82 based on certain pre-determined axial and/or azimuthal arrangements. In the second sub-diagram 70, eight sensors 84 (e.g., from 84-1 to 84-8) may be employed around the sensor holder 82 to detect reflected acoustic waves corresponding to various interfaces, including interfaces at the inner casing 74, the outer casing 66, and the sandstone formation 64, respectively. The eight sensors 84 form an axial array that is capable of detecting reflected acoustic waves propagating in multiple azimuthal sections. In the illustrated embodiment, an azimuth axis 86 may be used as a reference axis to quantify an azimuth angle 88 associated with each of the sensors 84. The sensor 84-1 is positioned at azimuth angle zero (azim 0 for simplicity) and the other sensors are positioned incrementally with respect to the azimuth axis 86 at an azimuthal interval of 45 degree. For example, the sensor 84-2 is positioned at azim 45, sensor 84-5 is positioned at azim 180, and the sensor 84-7 is positioned at azim 270, and so on.

A third sub-diagram 92 illustrates a series of Slowness-Time-Coherence (STC) maps based on monopole signals generated by the eight sensors 84 in response to detections of reflected acoustic wave arrivals from different directions (e.g., azimuths). Each STC map shows the monopole signals (e.g., amplitudes) representing reflected acoustic wave arrivals at different time along a first axis 94 (time axis) and with different slowness along a second axis 96 (slowness axis). As illustrated, the STC maps (e.g., five STC maps are presented corresponding to the sensors employed at azim 0, 45, 90, 135, and 180 degree, respectively) exhibit a footprint of the reflected acoustic wave arrivals approximated to 200 micro-second/ft as compact along the slowness axis 96 across all azimuths as highlighted by a rectangle 98, except at azimuths aligned with the water-filled section 76 where a degeneration or a significant disruption of the STC footprint arises as highlighted by an ellipse 100. Such degeneration or significant disruption of the STC footprint indicates the presence of azimuthally-localized heterogeneities, such as the presence of the water-filled section 76 in the partially cemented annulus B. In this way, the STC maps may provide vital information such as azimuthal heterogeneities of annular contents surround a cased well for well integrity evaluations.

Figure 4B:
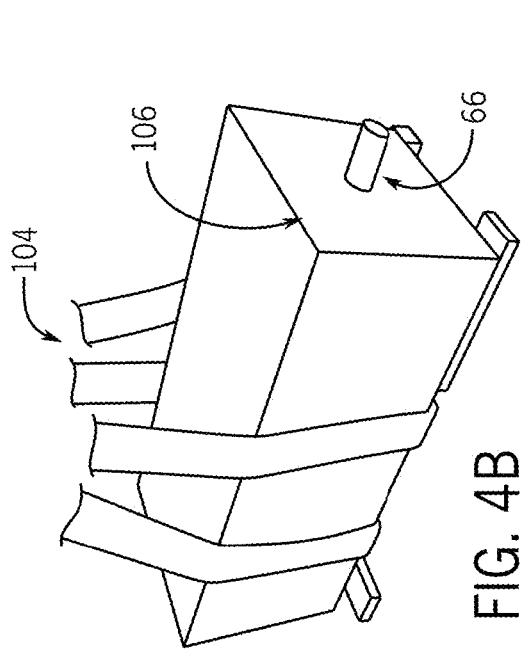
FIG. 4B depicts a one cubic meter sandstone rock block, as part of the experimental set up for sonic measurement through the double casing tubing inside a sandstone rock block using the scaled through tubing sonic monopole acquisition of FIG. 3, in accordance with embodiments of the present disclosure.
Figure 4C:
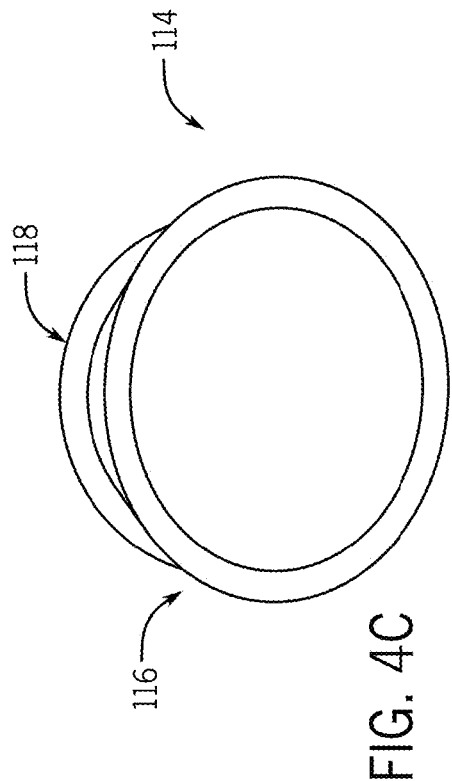
FIG. 4C depicts a close-up view of a partially cemented annulus, as part of the experimental set up for sonic measurement through the double casing tubing inside a sandstone rock block using the scaled through tubing sonic monopole acquisition of FIG. 3, in accordance with embodiments of the present disclosure.
Figure 4A:
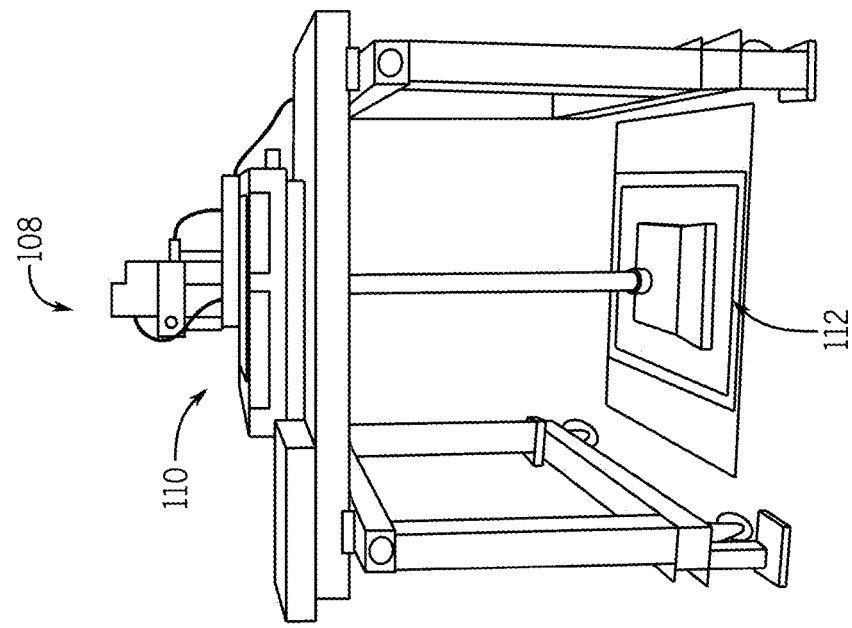
FIG. 4A depicts an axial and azimuthal scanning system set on top of a water-filled tank, as part of an experimental set up for sonic measurement through the double casing tubing inside a sandstone rock block using the scaled through tubing sonic monopole acquisition of FIG. 3.

FIG. 4 depicts an experimental set up for sonic measurement through the double casing tubing inside a one cubic meter sandstone rock block 106, as shown in a picture 104, using the scaled through tubing sonic monopole acquisition of FIG. 3. The outer casing 66 protrudes on one side of the sandstone rock block 106. A second picture 108 shows an axial and azimuthal scanning system 110 set on top of a water-filled tank 112 where immersion measurement takes place. For example, the one cubic meter sandstone rock block embedded with the double casing tubing may be immersed in the water-filled tank 112 to simulate a double casing well drilled into a geological formation. The azimuthal scanning system 110 may include a sonic source (e.g., a monopole, dipole, or quadrupole sonic source) to excite a double casing hole environment, and an array of sonic sensing elements (e.g., sensors 84) to detect reflected acoustic waves corresponding to various interfaces (e.g., interfaces at the inner casing 74, the outer casing 66, and the sandstone formation 64, respectively). A third picture 114 shows a close-up view of the partially cemented annulus B that includes a cemented section 116 and an un-cemented section 118 (e.g., a water channel). Note that the inner casing 74 is removed for the purpose of picture taking.

Figure 5:
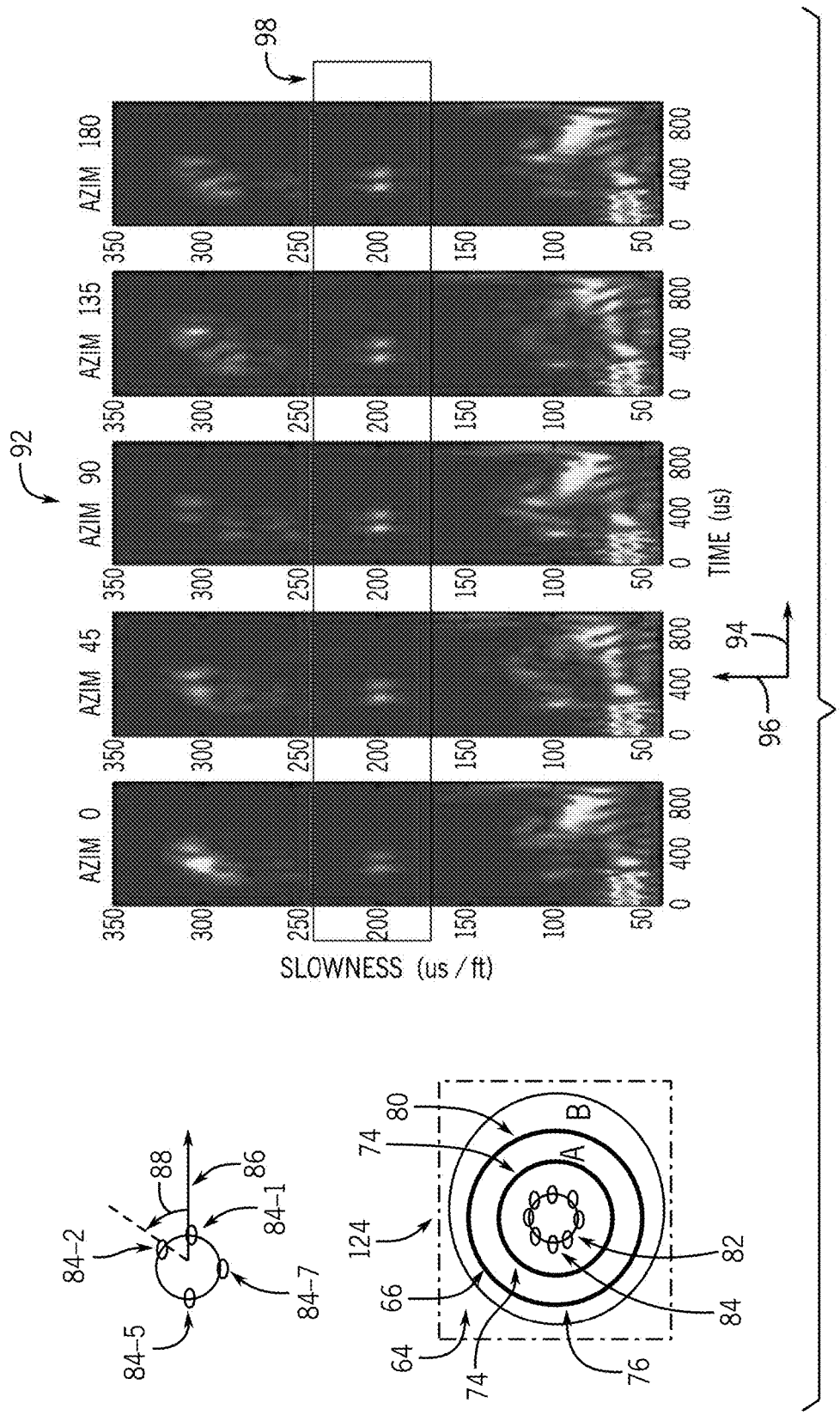
FIG. 5 depicts a schematic diagram of a cross-section view of a configuration for the double casing tubing inside the sandstone rock block of FIG. 4A, FIG. 4B, and FIG. 4C and corresponding Slowness-Time-Coherence (STC) maps, in accordance with embodiments of the present disclosure.
Figure 6:
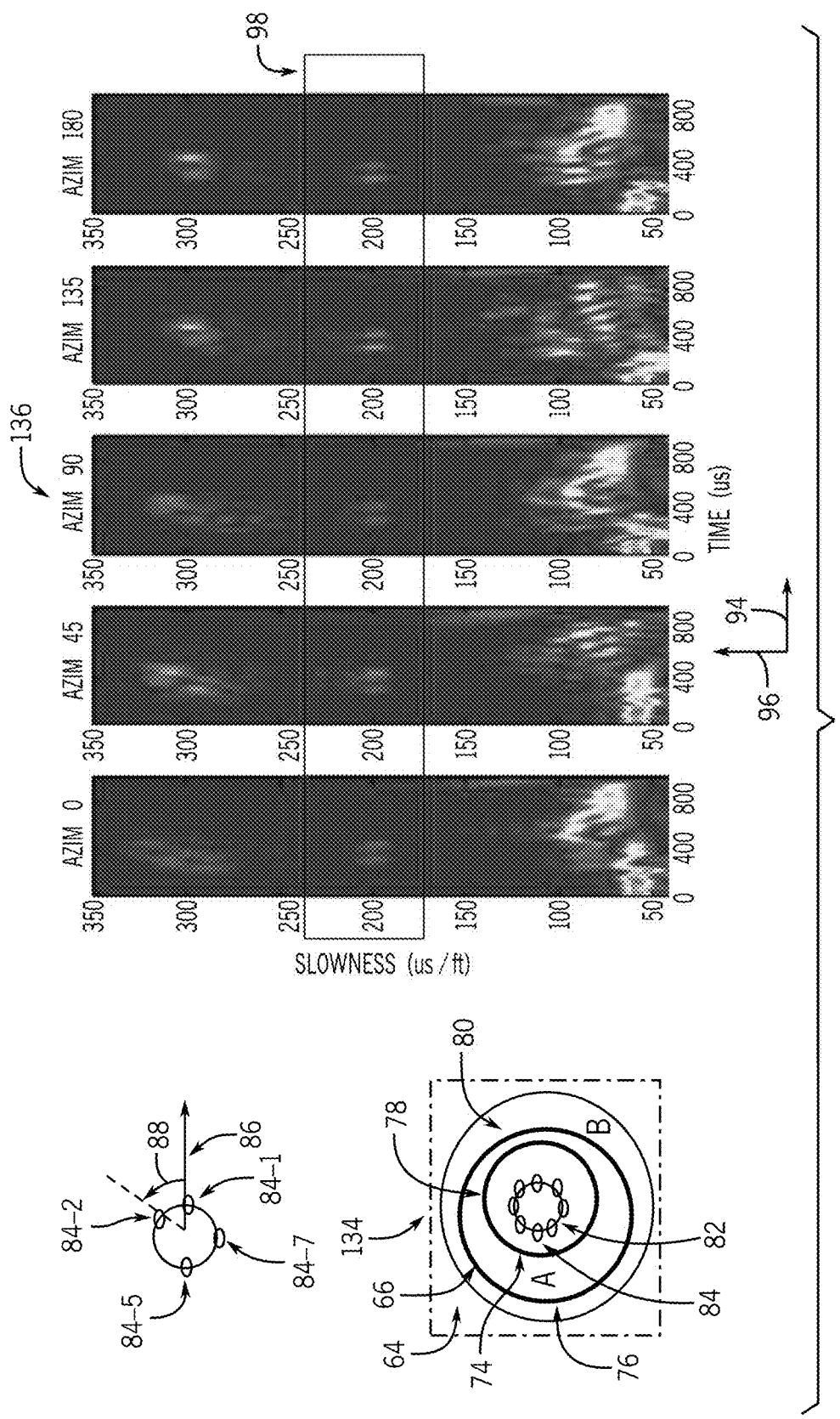
FIG. 6 depicts the same as in FIG. 5 but for a case where an inner casing of the double casing tubing is eccentric with respect to an outer casing, in accordance with embodiments of the present disclosure.
Figure 7:
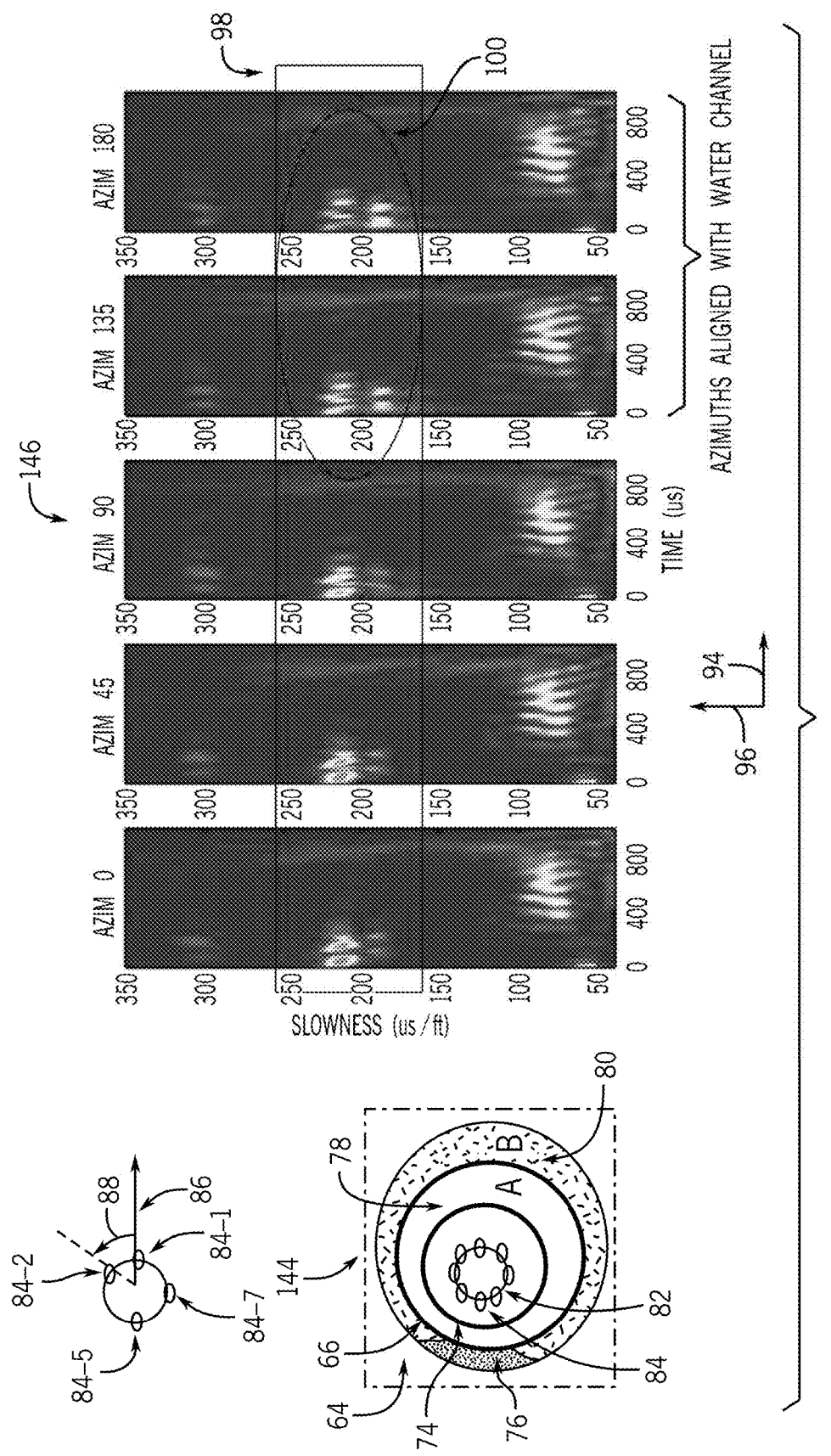
FIG. 7 depicts the same as in FIGS. 5 and 6 but for a case where an outer annulus is partially cemented leaving a water channel across an azimuthal range of 60 to 120 degrees, in accordance with embodiments of the present disclosure.

With the proceeding in mind, FIGS. 5-7 depict certain experimental results that demonstrate evidence for the disclosed systems and methods. Each figure corresponds to a specific tubing configuration (e.g., arrangement of the inner and outer casings). The figure captions describe the results and relate them to the invention. Certain element numbers and associated definitions (e.g., azimuth, time, or slowness axis) used in FIGS. 5-7 are same or similar to those used in FIG. 3.

FIG. 5 depicts a schematic diagram of a cross-section view of a configuration for the double casing tubing inside the sandstone rock block 106 of FIG. 4 and corresponding Slowness-Time-Coherence (STC) maps. In a cross-section view diagram 124, the outer casing 66 and inner casing 74 are concentric with respect to each other. As described above with reference to FIG. 3, the monopole sonic source excited signals are acquired by the eight sensors 84 at eight azimuthal locations (e.g., with a range of azimuth 0, 45, 90, 135, 180, 225, 270, and 315) along multiple equidistant axial positions simulating an axial array acquisition using the axial and azimuthal scanning system 110. Both the annulus A and the annulus B are water-filled. A display diagram 126 shows the STC maps based on monopole signals generated by the eight sensors 84 in response to detections of reflected acoustic wave arrivals propagating at the azimuths specified at the top of each STC map. The rectangle 98 highlights a compact arrival along the slowness axis 96 at all azimuths (e.g., five STC maps are presented for simplicity).

The compact arrival highlighted in the rectangle 98 exhibits an STC footprint of the reflected acoustic wave arrivals approximated to 200 micro-second/ft as compact along the slowness axis 96 across all azimuths. Because both the annulus A and the annulus B are water-filled, there is no degeneration or disruption of the STC footprint. Therefore, there is no indication of the presence of azimuthally-localized heterogeneities (e.g., the water-filled section 76 in the partially cemented annulus B of FIG. 3).

FIG. 6 depicts the same as in FIG. 5 but for a case where the inner casing 74 of the double casing tubing is eccentric with respect to the outer casing 66. As illustrated in a cross-section view diagram 134, the outer casing 66 and inner casing 74 are not concentric with respect to each other. As described above with reference to FIG. 3, the monopole sonic source excited signals are acquired by the eight sensors 84 at eight azimuthal locations (e.g., with a range of azimuth 0, 45, 90, 135, 180, 225, 270, and 315) along multiple equidistant axial positions simulating an axial array acquisition using the axial and azimuthal scanning system 110. Both the annulus A and the annulus B are water-filled. A display diagram 136 shows the STC maps based on monopole signals generated by the eight sensors 84 in response to detections of reflected acoustic wave arrivals propagating at the azimuths specified at the top of each STC map. The rectangle 98 highlights a compact arrival along the slowness axis 96 at all azimuths (e.g., five STC maps are presented for simplicity).

The STC maps show the particular arrival of interest (highlighted with the rectangle 98) remains compact and similar to the case of FIG. 5. The compact arrival exhibits the STC footprint of the reflected acoustic wave arrivals approximated to 200 micro-second/ft as compact along the slowness axis 96 across all azimuths. Such STC maps demonstrate that the eccentric casings do not perturb an arrival coherence signature indicated by the STC footprint. However, coherence amplitudes are noticeably non-uniform across all azimuths due to the eccentric casings.

Additionally, FIG. 7 depicts the same as in FIGS. 5 and 6 but for a case where the outer annulus B is partially cemented leaving a water channel across an azimuthal range of 60 to 120 degrees. As illustrated in a cross-section view diagram 144, the outer casing 66 and inner casing 74 are not concentric with respect to each other. As described above with reference to FIG. 3, the monopole sonic source excited signals are acquired by the eight sensors 84 at eight azimuthal locations (e.g., with a range of azimuth 0, 45, 90, 135, 180, 225, 270, and 315) along multiple equidistant axial positions simulating an axial array acquisition using the axial and azimuthal scanning system 110. Similar to the cases of FIGS. 5 and 6, the annulus A is water-filled. However, the annulus B is cemented to the sandstone rock block 106 across all azimuthal sections except for the water-filled section 76 (the water channel) across an azimuthal range of 60 to 120 degrees.

A display diagram 146 shows the STC maps based on monopole signals generated by the eight sensors 84 in response to detections of reflected acoustic wave arrivals propagating at the azimuths specified at the top of each STC map. The rectangle 98 highlights a compact arrival along the slowness axis 96 at all azimuths (five STC maps are presented for simplicity), except at azimuths aligned with the water-filled section 76 where a degeneration or a significant disruption of the STC footprint arises as highlighted by an ellipse 100. Such degeneration or significant disruption of the STC footprint indicates the presence of azimuthally-localized heterogeneities introduced by the presence of the water-filled section 76 in the partially cemented annulus B. In this illustrated embodiment, the STC maps provides vital information such as azimuthal heterogeneities of annular contents in annulus B. Such information may be utilized for well integrity evaluations.

Figure 8:
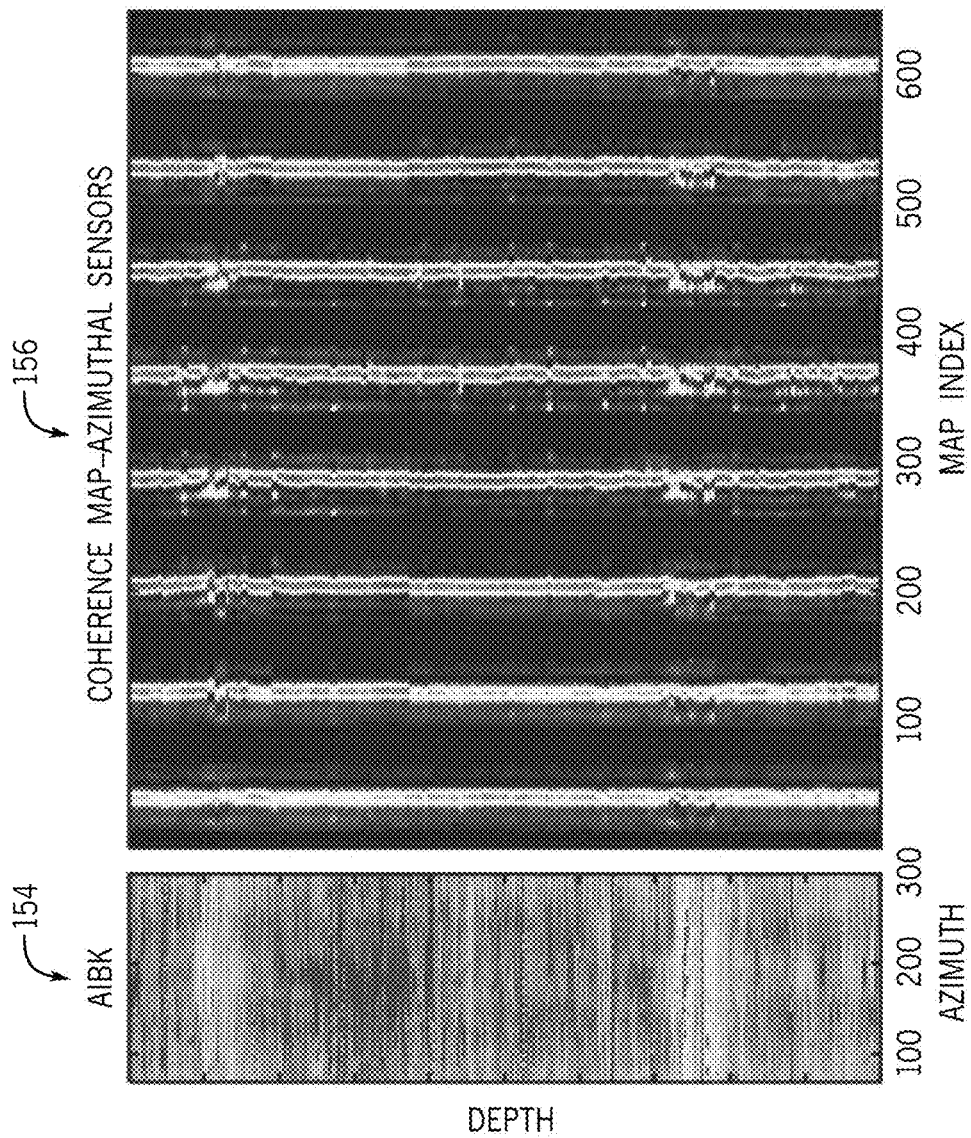
FIG. 8 depicts an example of a coherence map showing individual sensor responses from a sonic tool logging through tubing inside a cased well and shown on the right as a function of depth over a 100 m interval, in accordance with embodiments of the present disclosure.

FIG. 8 depicts an example of a coherence map of acoustic impedance behind an outer casing as a function of depth and azimuth and a processed sonic map showing individual sensor responses from a sonic tool logging through tubing inside a cased well. The example is taken from sonic log data acquired using a sonic tool equipped with eight azimuthal sensor arrays over a 100 m depth interval in an oil well. A coherence processing is applied to the sonic log data collected at each of the azimuthal sensor arrays after bandpass filtering and images similar to the ones shown above with reference to FIGS. 5-7 are generated for each of the depth frames collected. The processed data is then stacked by azimuth and depth to generate an image as a function of depth and map index that may serve as an indication of heterogeneities azimuthally and axially as a function of depth. FIG. 8 illustrates the results from the application of this approach in downhole field conditions to identify the presence of azimuthal and axial heterogeneities in the annulus B fill and bond by logging through tubing and casing.

For example, an ultrasonic log diagram 154 illustrates a validation log taken in an outer casing with an ultrasonic pulse-echo tool and showing the coherence map of acoustic impedance behind the outer casing as a function of depth and azimuth. The brown color denotes well bonded solids while light blue shows liquid pockets or disbonded casing. Note that the presence of the disbond or liquid is manifested by a destruction of the coherence values shown in a processed sonic map 156. The partial coverage of the disbonded section in an upper section of the processed sonic map 156 is reflected in a corresponding coverage of the azimuthal sections of the coherence map in the sonic log diagram 154.

One or more embodiments of a method may include exciting a cased hole configured with double casing with a sonic monopole and acquiring data with axial receiving element arrays of a receiver array system situated at multiple azimuthal sectors, for example 4, 5, 6, 7, 8, 10, 15 azimuthal sectors. The sonic monopole source may be located in the vicinity of the receiver array system. The method may also include processing acquired data with slowness-time-coherence (STC) techniques or similar approaches such as bandpass frequency filtering. The method may also include examining STC signatures of specific arrivals as to whether they exhibit uniform or non-uniform signatures across all azimuths. The method may also include deriving a map (e.g., coherence map) based on the characters (e.g., amplitudes, coherence) of the STC slowness signature that may be interpreted as reflecting the azimuthal coverage of contents of an annular space outside of an outer casing (e.g., the annulus B).

In one or more embodiments the method may include examining a multiplicity of the STC signature of a specific arrival along a slowness range of interest. For example, in a case where the multiplicity of the STC signature is single across all azimuths, examining the multiplicity may include diagnosing whether the annulus B is uniformly covered with the same content, either liquid-filled or solid-filled. In another case where the multiplicity of the STC signature is where it is multiple across particular azimuths, examining the multiplicity may include inferring and interpreting the existence of azimuthally localized heterogeneities in the annulus B.

FIG. 9 is a flow diagram of a method 158 of determining well integrity, as described in greater detail herein. In certain embodiments, the method 158 may include exciting a cased hole configured with double casing with at least one sonic source 26 (block 160). The double casing includes an inner casing 74 and an outer casing 66. In addition, in certain embodiments, the method 158 may also include acquiring signals with a plurality of receiving element arrays 84 situated at a plurality of azimuthal sectors in a vicinity of the at least one sonic source 26 (block 162). In addition, in certain embodiments, the method 158 may also include processing (e.g., using the data processing system 38) the acquired signals with the plurality of receiving element arrays 84 (block 164). In addition, in certain embodiments, the method 158 may also include examining (e.g., using the data processing system 38) the processed signals for arrivals and determining whether the arrivals exhibit uniform or non-uniform signatures across all azimuths (block 166). In addition, in certain embodiments, the method 158 may also include deriving a map based on the signatures reflecting azimuthal coverage of contents of an annular space B outside of the outer casing 66 (block 168).

In addition, in certain embodiments, processing of the acquired signals includes using slowness-time-coherence (STC) techniques or bandpass frequency filtering. In addition, in certain embodiments, the method 158 may also include processing the acquired signals to obtain STC signatures for specific arrival, and examining the STC signatures and determining whether the specific arrivals exhibit the uniform or non-uniform signatures across all azimuths. In addition, in certain embodiments, the method 158 may also include examining multiplicity of an STC signature of a specific arrival along a slowness range of interest. In such embodiments, the method 158 may also include determining that the annular space is uniformly covered with the same contents when the STC signature is single across all azimuths, and/or inferring an existence of azimuthally localized heterogeneities in the outer casing when the STC signature is multiple across multiple azimuths.

In addition, in certain embodiments, the at least one sonic source 26 may include a sonic monopole. In addition, in certain embodiments, the at least one sonic source 26 may include a segmented sonic source capable of radiating monopole, dipole, and higher-order modes including quadrupole, and/or an azimuthally-segmented sonic-source capable of radiating separately from each azimuthal segment and for each segment excited. In addition, in certain embodiments, the plurality of receiving element arrays 84 may be situated at at least four azimuthal sectors. In such embodiments, the plurality of receiving element arrays may be situated at eight azimuthal sectors, or may be situated at a number of azimuthal sectors greater than eight.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method of determining well integrity, comprising:
exciting a cased hole configured with double casing with at least one sonic source, wherein the double casing comprises an inner casing and an outer casing;
acquiring signals with a plurality of receiving element arrays situated at a plurality of azimuthal sectors in a vicinity of the at least one sonic source;
processing the acquired signals with the plurality of receiving element arrays;
examining the processed signals for arrivals and determining whether the arrivals exhibit uniform or non-uniform signatures across all azimuths;

processing the acquired signals to obtain slowness-time-coherence (STC) signatures for specific arrivals;
examining the STC signatures and determining whether the specific arrivals exhibit the uniform or non-uniform signatures across all azimuths;
examining multiplicity of an STC signature of a specific arrival along a slowness range of interest; and
deriving a map based on the signatures reflecting azimuthal coverage of contents of an annular space outside of the outer casing.

2. The method of claim 1, wherein processing of the acquired signals comprises using slowness-time-coherence (STC) techniques or bandpass frequency filtering.

3. The method of claim 1, comprising determining that the annular space is uniformly covered with the same contents when the STC signature is single across all azimuths.

4. The method of claim 1, comprising inferring an existence of azimuthally localized heterogeneities in the outer casing when the STC signature is multiple across multiple azimuths.

5. The method of claim 1, wherein the at least one sonic source comprises a sonic monopole.

6. The method of claim 1, wherein the at least one sonic source comprises a segmented sonic source capable of radiating monopole, dipole, and higher-order modes comprising quadrupole.

7. The method of claim 1, wherein the at least one sonic source comprises an azimuthally-segmented sonic-source capable of radiating separately from each azimuthal segment and for each segment excited.

8. The method of claim 1, wherein the plurality of receiving element arrays are situated at at least four azimuthal sectors.

9. The method of claim 1, wherein the plurality of receiving element arrays are situated at eight azimuthal sectors.

10. The method of claim 1, wherein the plurality of receiving element arrays are situated at a number of azimuthal sectors greater than eight.

11. A method of determining well integrity, comprising:
exciting a cased hole configured with double casing with at least one sonic source, wherein the double casing comprises an inner casing and an outer casing;
acquiring signals with a plurality of receiving element arrays situated at a plurality of azimuthal sectors in a vicinity of the at least one sonic source;
processing the acquired signals with the plurality of receiving element arrays using slowness-time-coherence (STC) techniques or bandpass frequency filtering to obtain STC signatures for specific arrivals;
examining the STC signatures for the specific arrivals and determining whether the specific arrivals exhibit uniform or non-uniform signatures across all azimuths;
examining multiplicity of an STC signature of a specific arrival along a slowness range of interest; and
deriving a map based on the signatures reflecting azimuthal coverage of contents of an annular space outside of the outer casing.

12. The method of claim 11, comprising determining that the annular space is uniformly covered with the same contents when the STC signature is single across all azimuths.

13. The method of claim 11, comprising inferring an existence of azimuthally localized heterogeneities in the outer casing when the STC signature is multiple across multiple azimuths.

14. The method of claim 11, wherein the plurality of receiving element arrays are situated at at least four azimuthal sectors.

15. The method of claim 14, wherein the plurality of receiving element arrays are situated at eight azimuthal sectors.

16. The method of claim 14, wherein the plurality of receiving element arrays are situated at a number of azimuthal sectors greater than eight.

17. A method of determining well integrity, comprising:
exciting a cased hole configured with double casing with at least one sonic source, wherein the double casing comprises an inner casing and an outer casing;
acquiring signals with a plurality of receiving element arrays situated at a plurality of azimuthal sectors in a vicinity of the at least one sonic source;
processing the acquired signals with the plurality of receiving element arrays using slowness-time-coherence (STC) techniques or bandpass frequency filtering to obtain STC signatures for specific arrivals;
examining the STC signatures for the specific arrivals and determining whether the specific arrivals exhibit uniform or non-uniform signatures across all azimuths, wherein examining the STC signatures comprises examining multiplicity of an STC signature of a specific arrival along a slowness range of interest, determining that an annular space outside of the outer casing is uniformly covered with the same contents when the STC signature is single across all azimuths, and inferring an existence of azimuthally localized heterogeneities in the outer casing when the STC signature is multiple across multiple azimuths; and
deriving a map based on the signatures reflecting azimuthal coverage of contents of the annular space.

* * * * *